(12) United States Patent
Youtz et al.

(10) Patent No.: US 11,638,189 B2
(45) Date of Patent: Apr. 25, 2023

(54) SYSTEM AND METHOD FOR MINIMIZING TRANSITIONS BETWEEN CORE NETWORKS

(71) Applicant: Verizon Patent and Licensing Inc., Basking Ridge, NJ (US)

(72) Inventors: Andrew E. Youtz, Princeton, NJ (US); Deepa Jagannatha, Bridgewater, NJ (US); Susan Wu Sanders, Bridgewater, NJ (US); Lily Zhu, Parsippany, NJ (US); Hui Zhao, Marlboro, NJ (US); Monte Giles, Chester, NJ (US); Samirkumar Patel, Middlesex, NJ (US); Xin Wang, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 302 days.

(21) Appl. No.: 16/859,012

(22) Filed: Apr. 27, 2020

(65) Prior Publication Data
US 2021/0337448 A1    Oct. 28, 2021

(51) Int. Cl.
*H04W 36/08* (2009.01)
*H04L 5/14* (2006.01)
*H04W 76/27* (2018.01)
*H04W 24/10* (2009.01)

(52) U.S. Cl.
CPC ............... *H04W 36/08* (2013.01); *H04L 5/14* (2013.01); *H04W 24/10* (2013.01); *H04W 76/27* (2018.02)

(58) Field of Classification Search
None
See application file for complete search history.

(56) References Cited

U.S. PATENT DOCUMENTS

| | | | | |
|---|---|---|---|---|
| 10,966,206 B2* | 3/2021 | Webb | ................ | H04W 72/0473 |
| 11,206,549 B1* | 12/2021 | Eyuboglu | ............ | H04J 11/0073 |
| 2017/0013573 A1* | 1/2017 | Jung | .................... | H04W 56/001 |
| 2017/0289958 A1* | 10/2017 | Dev | ....................... | H04W 60/02 |
| 2018/0041936 A1* | 2/2018 | Kim | ..................... | H04W 72/085 |
| 2020/0313838 A1* | 10/2020 | Jin | ..................... | H04W 72/0453 |

* cited by examiner

*Primary Examiner* — Saba Tsegaye (57) ABSTRACT

A method, a system, and a non-transitory storage medium are described in which a core network selection service is provided. The core network selection service may minimize end devices transitioning between core networks of a multi-radio access technology (RAT) radio access network (RAN) based on cell selection priority configurations. The cell selection priority configurations may be provisioned on the end device via control messaging, such as system information block messages. The core network selection service may manage the end devices when in idle mode and in a connected mode.

20 Claims, 10 Drawing Sheets

```
┌─────────────────────────────────────────────────────┐
│ GENERATE A SIB MESSAGE THAT INCLUDES CELL SELECTION │
│                PRIORITY INFORMATION                  │
│                        505                           │
└─────────────────────────────────────────────────────┘
                          ↓
┌─────────────────────────────────────────────────────┐
│        TRANSMIT THE SIB MESSAGE TO AN END DEVICE     │
│                        510                           │
└─────────────────────────────────────────────────────┘
```

SYSTEM AND METHOD FOR MINIMIZING TRANSITIONS BETWEEN CORE NETWORKS

BACKGROUND

Development and design of radio access networks (RANs), core networks, and application service networks, present certain challenges from a network-side perspective and an end device perspective. For example, depending on the configurations from both network-side and end device-side perspectives, such configurations may impact various performance metrics, such as accessibility, congestion, latency, throughput, etc. Accordingly, a need exists to overcome these challenges.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

In Fifth Generation (5G) new radio (NR) standalone (SA) deployments, a RAN may be limited to the number and/or type of frequency bands. For example, the RAN may have a frequency division duplex (FDD) low band (e.g., a coverage band) and a time division duplex (TDD) mid-band (e.g., a high-speed overlay). Due to these RAN spectrum limitations, the RAN may be configured to push user equipment (UE) to operate in a Long Term Evolution (LTE)/NR non-stand alone (NSA) mode so as to provide an optimal data rate to a user. For example, within an area where there is only NR SA FDD low band coverage, LTE carrier aggregation (CA) may provide a UE with faster data rates. Additionally, within a NR SA TDD mid-band area, a downlink coverage area may be larger than an uplink coverage area.

The transitioning between an NR SA mode and an LTE/NR NSA mode may create additional core network traffic (e.g., signaling traffic) as the connectivity of the UE changes between a 5G core (5GC) network and an evolved packet core (EPC) network, and may produce undesirable data gaps during this transition. Further, there may be a potential of a ping-pong effect depending on the movement of the UE and other factors.

According to exemplary embodiments, a core network selection service is provided. According to an exemplary embodiment, the core network selection service may configure cell selection and cell reselection (referred to herein as "cell selection") procedures and priorities pertaining to RAN devices of a multi-radio access technologies (RATs) RAN and associated multi-core networks, as described herein. For example, the multi-RAT may include LTE and NR, and the multi-core network may include EPC network and a 5GC network. According to an exemplary embodiment, the core network selection service may provide a cell selection priority list that may be transmitted by the RAN devices to end devices. According to another exemplary embodiment, the core network selection service may provide a cell selection parameter value that may prevent an end device from camping on or ensure that the end device camps on a certain type of cell and associated core network type while in a certain locale, as described herein. For example, the cell selection parameter value may relate to a cell selection criterion S. According to an exemplary embodiment, the core network selection service may obtain measurements of neighboring cells from an end device and may be used by a RAN device to trigger a handover to another RAN device of a different RAT type based on such measurements, as described herein.

In view of the foregoing, the core network selection service may minimize unnecessary core network traffic stemming from the mobility of the end device and associated core network transitions. Additionally, the core network selection service may improve the utilization of resources from the network-side and end device-side perspectives, network performance metrics, quality of service (QoS), and other factors that may necessarily flow therefrom.

Figure 1:
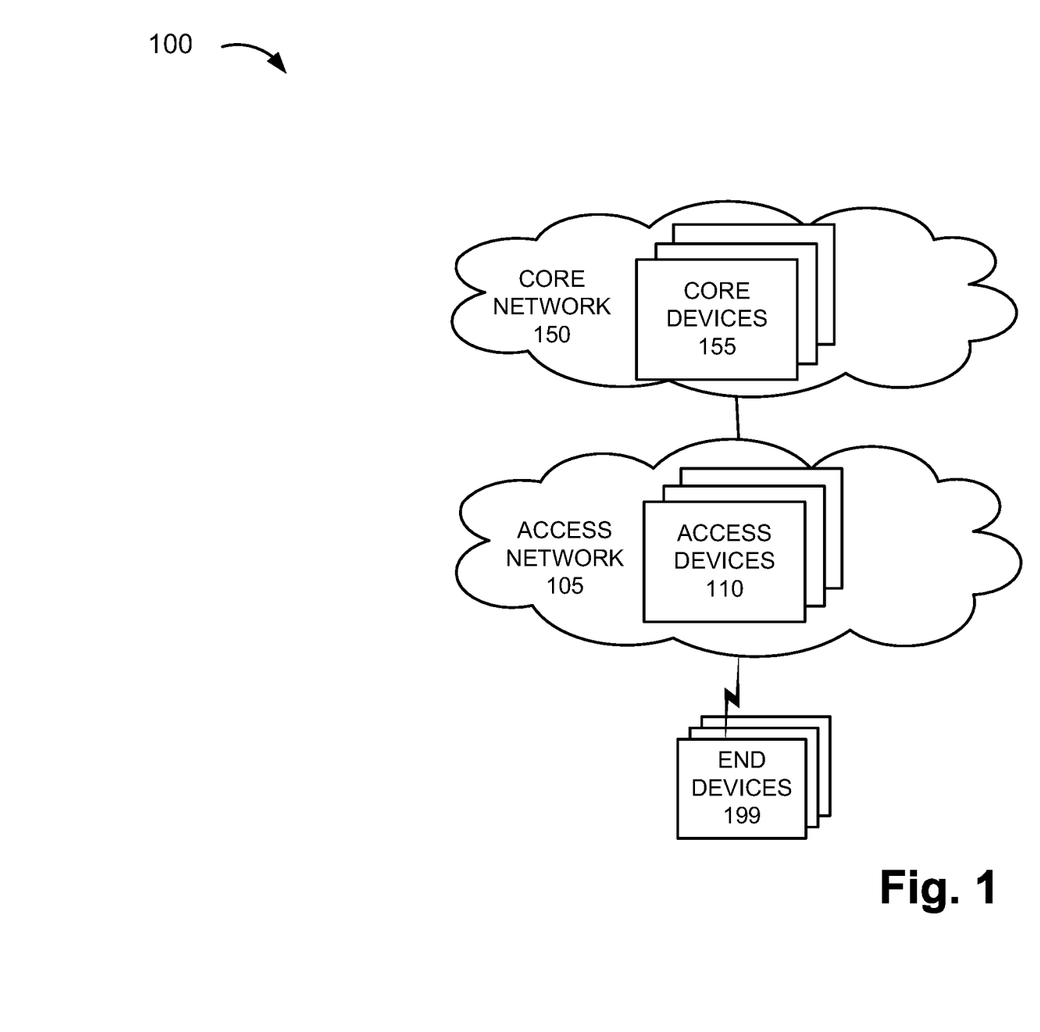
FIG. 1 is a diagram illustrating an exemplary environment in which an exemplary embodiment of a core network selection service may be implemented.

FIG. 1 is a diagram illustrating an exemplary environment 100 in which an exemplary embodiment of the core network selection service may be implemented. As illustrated, environment 100 includes an access network 105, and a core network 150. Access network 105 includes access devices 110, and core network 150 includes core devices 155. Environment 100 further includes end devices 199.

The number, type, and arrangement of networks illustrated in environment 100 are exemplary. Additionally, or alternatively, other networks not illustrated in FIG. 1 may be included in environment 100, such as a backhaul network, a fronthaul network, an application layer network, or another type of intermediary network.

The number, the type, and the arrangement of network devices in access network 105, and core network 150, as illustrated and described, are exemplary. The number of end devices 199 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the core network selection service may use at least one of these planes of communication. According to various exemplary implementations, the interface of the network device may be a service-based interface, a reference point-based interface, an Open Radio Access Network (O-RAN) interface, or some other type of interface.

Access network 105 may include one or multiple networks of one or multiple types and technologies. For example, access network 105 may be implemented to include a next generation RAN (e.g., a Fifth Generation (5G)-access network (5G-AN) or a 5G-RAN (referred to herein as simply a 5G-RAN)), another type of future generation RAN, a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, and/or another type of RAN (e.g., a legacy Third Generation (3G) RAN, etc.). Access network 105 may further include other types of wireless networks, such as a Wi-Fi network, a Worldwide Interoperability for Microwave Access (WiMAX) network, a local area network (LAN), a Bluetooth network, a personal area network (PAN), a Citizens Broadband Radio System (CBRS) network, or another type of wireless network (e.g., a legacy Third Generation (3G) RAN, O-RAN Reference Architecture, a virtualized RAN (vRAN), a self-organizing network (SON), etc.). Access network 105 may include a wired network, an optical network, or another type of network that may provide communication with core network 150, for example.

Access network 105 may include different and multiple functional splitting, such as options 1, 2, 3, 4, 5, 6, 7, or 8 that relate to combinations of access network 105 and core network 120 including an Evolved Packet Core (EPC) network and/or a NG core (NGC) network (also known as 5GC), or the splitting of the various layers (e.g., physical layer, Media Access Control (MAC) layer, RLC layer, and PDCP layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of services, such as dual connectivity (DC) or higher (e.g., a secondary cell group (SCG) split bearer service, a master cell group (MCG) split bearer, an SCG bearer service, E-UTRA-NR (EN-DC), NR-E-UTRA-DC (NE-DC), NG RAN E-UTRA-NR DC (NGEN-DC), or another type of DC (e.g., multi-RAT (MR-DC), single-RAT (SR-DC), SA NR-NR DC, etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone (NSA) (e.g., non-standalone NR, non-standalone E-UTRA, etc.), standalone (SA) (e.g., standalone NR, standalone E-UTRA, etc.), etc.).

According to various exemplary embodiments, access network 105 may be implemented to include various architectures of wireless service, such as, for example, macrocell, microcell, femtocell, picocell, metrocell, NR cell, LTE cell, non-cell, or another type of architecture. Additionally, according to various exemplary embodiments, access network 105 may be implemented according to various wireless technologies (e.g., RATs, etc.), wireless standards, wireless frequencies/bands/carriers (e.g., centimeter (cm) wave, millimeter (mm) wave, below 6 Gigahertz (GHz), above 6 GHz, licensed radio spectrum, unlicensed radio spectrum, NR low band, NR mid-band, NR high band, etc.), and/or other attributes of radio communication.

Depending on the implementation, access network 105 may include one or multiple types of network devices, such as access devices 110. For example, access devices 110 may include a next generation Node B (gNB), an evolved Node B (eNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB, etc.), a future generation wireless access device, another type of wireless node (e.g., a WiMax device, a hotspot device, etc.) that provides a wireless access service. According to some exemplary implementations, access devices 110 may include a combined functionality of multiple RATs (e.g., 4G and 5G functionality).

Core network 150 may include one or multiple networks of one or multiple types and technologies. According to an exemplary embodiment, core network 150 includes a complementary network of access network 105. For example, core network 150 may be implemented to include a 5GC network (also known as a next generation core (NGC) network) (or other type of a future generation network), an EPC of an LTE network, an LTE-Advanced (LTE-A) network, and/or an LTE-A Pro network. Core network 150 may include a legacy core network.

Depending on the implementation, core network 150 may include various types of network devices, such as core devices 155. For example, core devices 155 may include a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy charging and rules function (PCRF), a charging system (CS), a user plane function (UPF), a Non-3GPP Interworking Function (N3IWF), an access and mobility management function (AMF), a session management function (SMF), a unified data management (UDM) device, a unified data repository (UDR) device, an authentication server function (AUSF), a network slice selection function (NSSF), a network repository function (NRF), a policy control function (PCF), a network data analytics function (NWDAF), a network exposure function (NEF), a lifecycle management (LCM) device, and/or an application function (AF). According to other exemplary implementations, core devices 155 may include additional, different, and/or fewer network devices than those described. For example, core devices 155 may include a non-standard and/or a proprietary network device, or another type of network device that may be well-known but not particularly mentioned herein. Core devices 155 may also include a network device that provides a multi-RAT functionality (e.g., 4G and 5G), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.). Access network 105 and/or core network 150 may include a public network, a private network, and/or an ad hoc network.

End device 199 includes a device that has computational and wireless communicative capabilities. Depending on the implementation, end device 199 may be a mobile device, a portable device, a stationary device, a device operated by a user (e.g., UE, etc.), or a device not operated by a user (e.g., an Internet of Things (IoT) device, etc.). For example, end device 199 may be implemented as a smartphone, a mobile phone, a personal digital assistant, a tablet, a netbook, a phablet, a wearable device (e.g., a watch, glasses, etc.), a computer, a device in a vehicle, a gaming device, a music device, an IoT device, or other type of wireless device. End device 199 may be configured to execute various types of software (e.g., applications, programs, etc.). The number and the types of software may vary among end devices 199.

Figure 2:
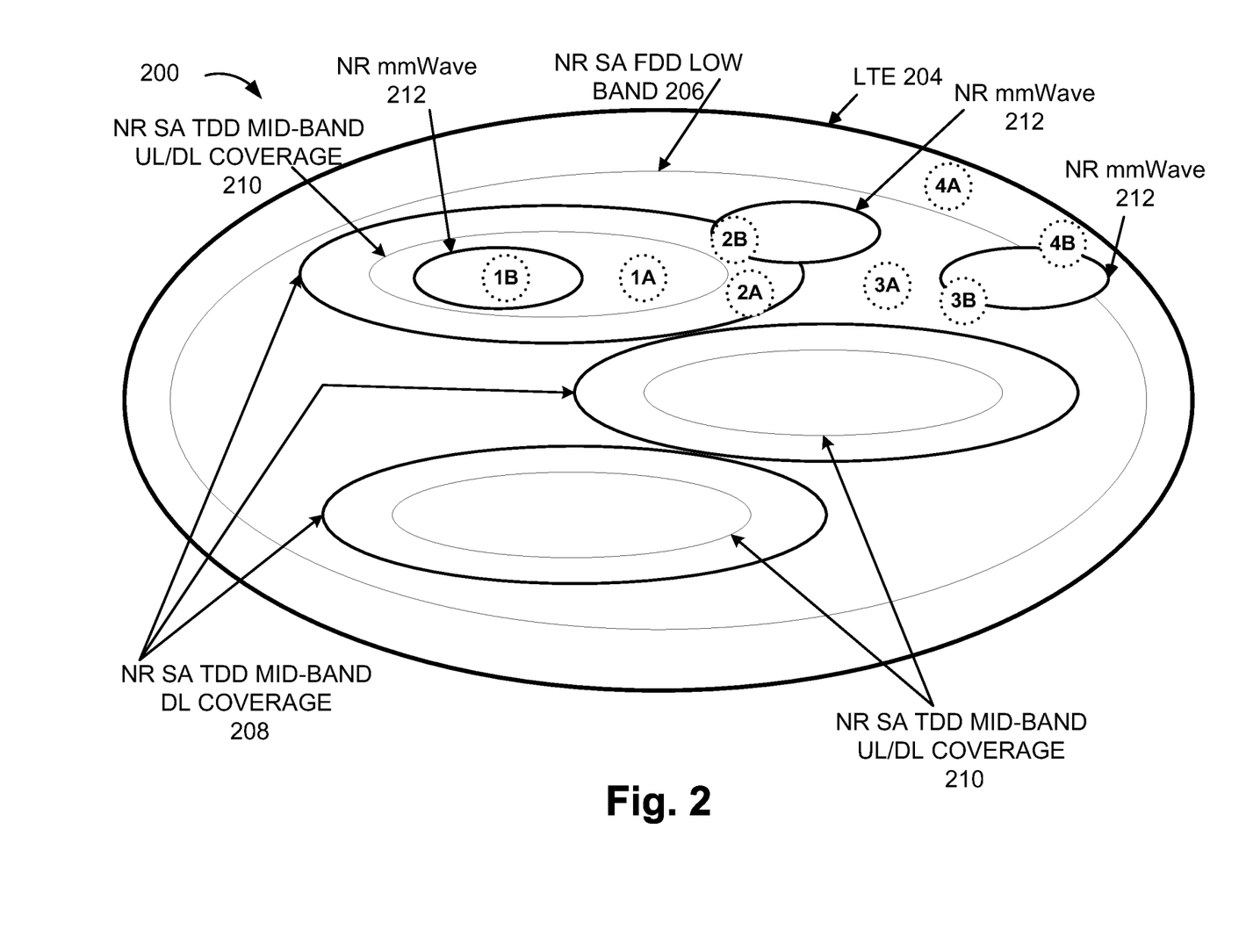
FIG. 2 is a diagram illustrating another exemplary environment in which an exemplary embodiment of the core network selection service may be implemented.

FIG. 2 is a diagram illustrating an exemplary environment 200 in which an exemplary embodiment of the core network selection service may be implemented. As illustrated, environment 200 depicts different areas within which different wireless services may be implemented. The shape, the size, and the arrangement of the areas are exemplary, as well as the RAT and other aspects of the wireless service (e.g., uplink (UL), downlink (DL), radio spectrum, etc.) described herein. Although not illustrated, it may be assumed that access devices 110 may be situated within environment 200 to provide the wireless services described herein. 1A, 1B, 2A, 2B, 3A, 3B, 4A, and 4B represent where end device 199 may be situated at a given time for purposes of description of the core network selection service. Depending on where end device 199 may be situated relative to the different areas, end device 199 may be afforded a certain coverage or access. As described herein, the core network selection service may manage various aspects of the wireless service based on various factors, as described herein. Further, the areas depicted in environment 200 may be interpreted as a Venn diagram, as described herein.

Referring to FIG. 2, environment 200 includes an LTE area 204 within which end device 199 may obtain LTE uplink and downlink access. The LTE coverage may include LTE, LTE-A, and/or LTE-A Pro. Environment 200 may include a NR SA FDD low band area 206 within which end device 199 may obtain NR SA FDD low band uplink and downlink access and LTE uplink and downlink access. The frequency band or radio spectrum considered NR (SA) low band may be configurable. As one example, the NR SA FDD low band may be (about) sub-3 Gigahertz (GHz) spectrum. However, other threshold values for NR (SA) low band may be implemented. NR SA FDD low band area 206 may provide NR SA FDD low band coverage in the uplink and the downlink.

Environment 200 also may include a NR SA TDD mid-band DL coverage area 208 within which end device 199 may obtain NR SA TDD mid-band access in the downlink access, as well as the NR SA FDD low band and LTE coverages in the downlink and uplink. The frequency band or radio spectrum considered NR (SA) mid-band may be configurable. As one example, the NR (SA) TDD mid-band may be above (about) 2.5 GHz spectrum. However, other threshold values for NR (SA) mid-band may be implemented. As further illustrated, environment 200 may include a NR SA TDD mid-band UL/DL coverage area 210 within which end device 199 may obtain NR SA TDD mid-band access in the uplink and the downlink access, the NR SA TDD mid-band DL coverage, the NR SA FDD low band coverage, and the LTE coverage. The radio spectrum for NR (SA) mid-band for the downlink may be different from or the same as the NR (SA) mid-band for the uplink. Additionally, the NR (SA) mid-band for the downlink and the NR (SA) mid-band for the uplink may have the same or different threshold values relating to mid-band. The threshold values relating to radio spectrum, as described herein, may be implemented as a single threshold value (e.g., above, below, etc.) or multiple threshold values (e.g., within a range of threshold values).

Additionally, environment 200 may include an NR mmWave area 212 within which end device 199 may obtain NR mmWave coverage, as well other coverages depicted in FIG. 2. For example, when end device 199 is situated at 1B, end device 199 may access NR mmWave when in a Radio Resource Control (RRC) connected mode using a frequency range 1 (FR1) and FR2 (e.g., NR mmWave) dual connectivity. Additionally, for example, when end device 199 is situated at 2B and 3B, end device 199 may access mmWave when in RRC connected mode, using either FR1 and FR2 dual connectivity or EN-DC depending on whether the current serving cell is NR SA or LTE, respectively. Also, for example, when end device 199 is situated at 4B, end device 199 may access mmWave when in RRC connected mode, using LTE-NR dual connectivity (EN-DC).

Figure 3A:
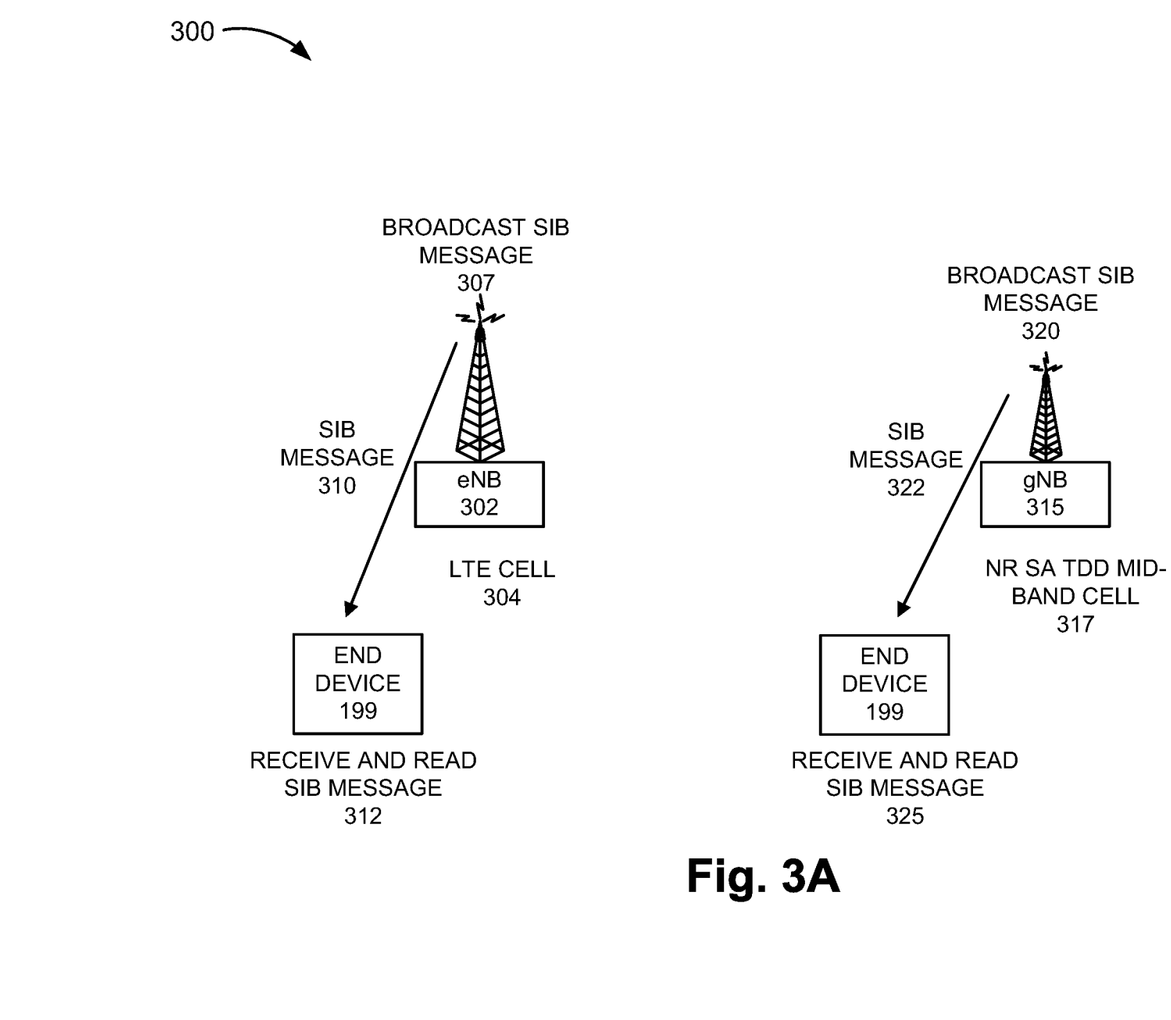
FIG. 3A is a diagram illustrating an exemplary process of an exemplary embodiment of the core network selection service.

FIG. 3A is a diagram illustrates an exemplary process 300 of the core network selection service. For example, an eNB 302 of an LTE cell 304 may broadcast a System Information Block (SIB) message 307 to end device 199. SIB message 310 may include a cell selection priority list or other form of data that indicates priorities for cell selection. For example, the priority data may indicate (e.g., from highest to lowest) an order of priority. According to an exemplary implementation, the order of priority may be NR SA TDD mid-band followed by LTE bands. According to such an implementation, the NR SA FDD low band may be omitted from the priority data. According to an exemplary implementation, SIB message 310 may be a SIB 24 type or another suitable SIB message type (e.g., SIB 1, SIB 3, SIB 4, SIB 5, etc.). As illustrated, end device 199 may receive and read the SIB message 312. End device 199 may perform cell selection accordingly. According to other exemplary embodiments, the provisioning of cell selection priority data of end device 199 may be implemented differently, such as the transmission of an RRC Connection Release message including the cell selection priority data.

According to another exemplary scenario, a gNB 315 of an NR SA TDD mid-band cell 317 may broadcast a SIB message 320 to end device 199. SIB message 322 may include a cell selection priority list or other form of data that indicates priorities for cell selection. For example, the priority data may indicate (e.g., from highest to lowest) an order of priority. According to an exemplary implementation, SIB message 322 may be a SIB 1, SIB 2, SIB 3, SIB 4, or SIB 5 message type or another suitable SIB message type. According to an exemplary implementation, the order of priority may be NR SA TDD mid-band, NR SA FDD low band, followed by LTE bands. As illustrated, end device 199 may receive and read the SIB message 325. End device 199 may perform cell selection accordingly. According to other exemplary embodiments, the provisioning of cell selection priority data of end device 199 may be implemented differently, such as the transmission of an RRC Connection Release message including the cell selection priority data.

According to another exemplary embodiment, the core network selection service may manage cell selection of NR SA TDD mid-band cells when end device 199 is situated in NR SA TDD mid-band DL coverage area 208 because there is no uplink coverage. For example, as part of cell selection criterion S value (e.g., Srxlev value), a parameter value of S (e.g., $Q_{rxlevmin}$ and/or $Q_{rxlevminoffset}$, etc.) may be provisioned on end device 199 to manage a cell selection procedure. In this way, end device 199 may not camp on an NR SA TDD mid-band cell when situated at 2A and 2B of FIG. 2, for example. As an example, an NR SA TDD mid-band cell device may transmit a SIB message (e.g., SIB 1, etc.), which includes the $Q_{rxlevmin}$ and/or $Q_{rxlevminoffset}$ values, to end device 199. As a part of a cell selection procedure, end device 199 may calculate the cell selection criterion S value based on the provisioned Q value.

According to still another exemplary embodiment, the core network selection service may request that end device 199 provide neighboring cell measurements. Based on these measurements, the core network selection service may trigger a handover of end device 199. For example, end device 199 may be in an RRC connected mode relative to eNB 302 (e.g., LTE cell) when situated at 2A (e.g., within NR SA TDD mid-band DL coverage area 208), eNB 302 may request (e.g., via an RRC Connection Reconfiguration message, an RRC Measurement Report message, or other suitable message) or end device 199 may be configured to obtain NR SA measurements relating to neighboring NR RAN devices (e.g., gNB 315, etc.). End device 199 may provide these measurements to eNB 302 (e.g., via an RRC Connection Reconfiguration Complete message, an RRC Measurement Report message, or other suitable message). eNB 302 may determine whether to invoke a handover or not based on the measurements (e.g., based on a threshold value). eNB 302 may trigger a handover of end device 199 to an NR SA cell (e.g., gNB 315) when the threshold value or other type of configuration is satisfied. Conversely, when not satisfied, eNB 302 may not trigger the handover.

According to another example, end device 199 may be in an RRC connected mode relative an NR SA cell (e.g., gNB 315) when situated at 3A (e.g., within NR SA FDD low band coverage area 206), gNB 315 may request (e.g., via an RRC Connection Reconfiguration message, an NR RRC Measurement Report message, or other suitable message) or end device 199 may be configured to obtain LTE measurements relating to neighboring LTE RAN devices (e.g., eNB 302, etc.). End device 199 may provide these measurements to gNB 315 (e.g., via an RRC Connection Reconfiguration Complete message or other suitable message). gNB 315 may determine whether to invoke a handover or not based on the measurements (e.g., based on a threshold value). gNB 315 may trigger a handover of end device 199 to an LTE cell (e.g., eNB 302) when the threshold value or other type of configuration is satisfied. Conversely, when not satisfied, gNB 315 may not trigger the handover.

Figure 3B:
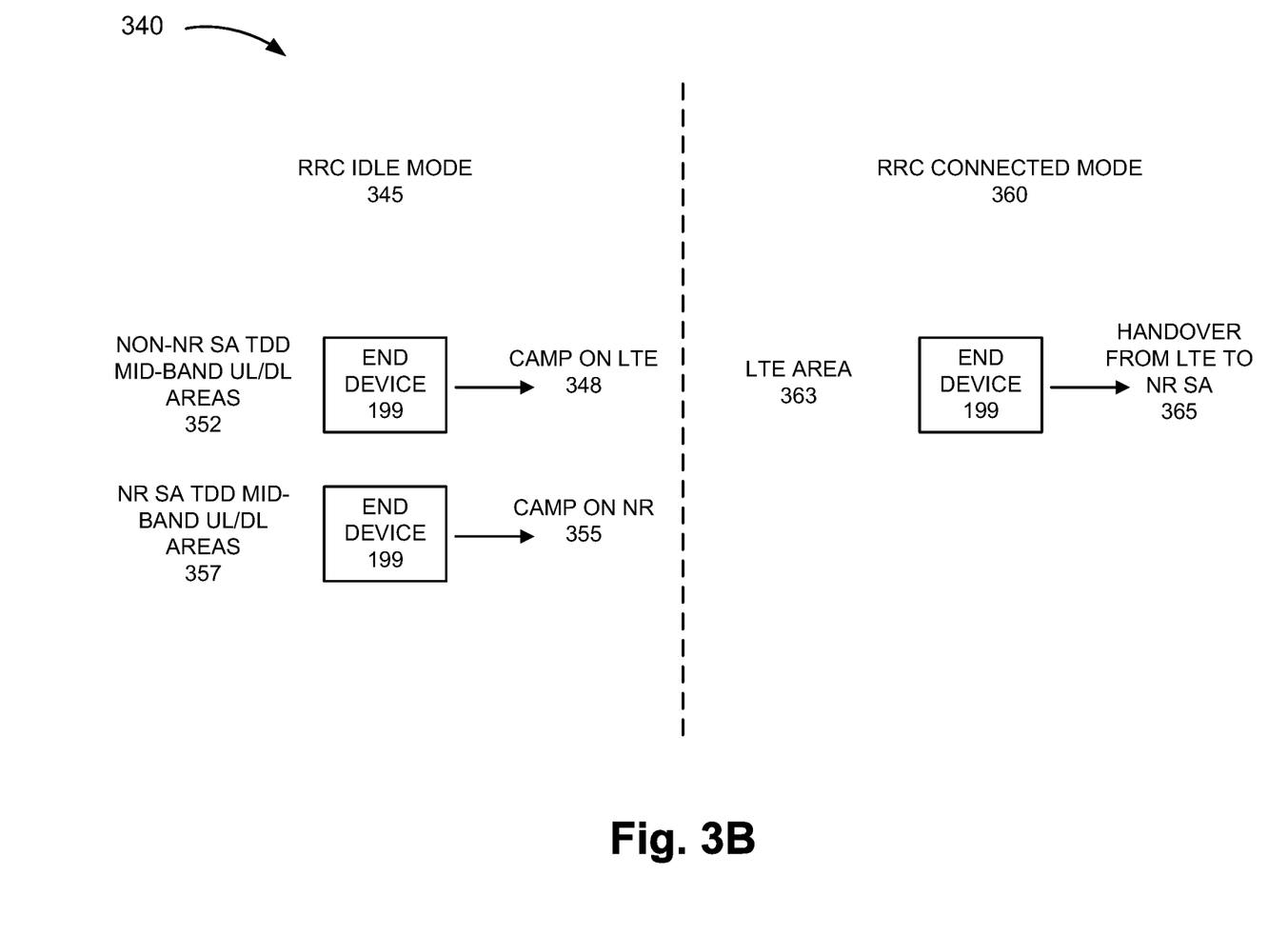
FIG. 3B is a diagram illustrating another exemplary process of an exemplary embodiment of the core network selection service.

FIG. 3B is a diagram illustrating another exemplary process 340 of the core network selection service. Process 340 may relate to when end device 199 moves from 4A to 1A of FIG. 2. Referring to FIG. 3B and FIG. 2, for example, when end device 199 may be in a RRC idle mode 345, end device 199 may camp on an LTE cell 348 when end device 199 may move from 4A, to 3A, to 2A (e.g., non-NR SA TDD mid-band UL/DL areas 352), and may camp on an NR SA TDD mid-band cell 355 when end device 199 may be situated at 1A (e.g., NR SA TDD mid-band UL/DL areas 357).

As further illustrated, when end device 199 may be in an RRC connected mode 360 on an LTE cell 363 (e.g., at 2A of FIG. 2), the core network selection service may perform a handover from the LTE cell to an NR SA cell 365. For example, the NR SA cell service may include CA between an NR SA FDD low band cell (e.g., primary cell (PCell)) and an NR SA mid-band cell (e.g., secondary cell (SCell)). If end device 199 transitions to an RRC idle mode after the handover while situated at 2A, for example, end device 199 may camp on the NR SA FDD low band cell. There may be no further transitions between the 5GC network and the EPC network unless end device 199 moves back to 3A or 4A of FIG. 2, for example.

Figure 3C:
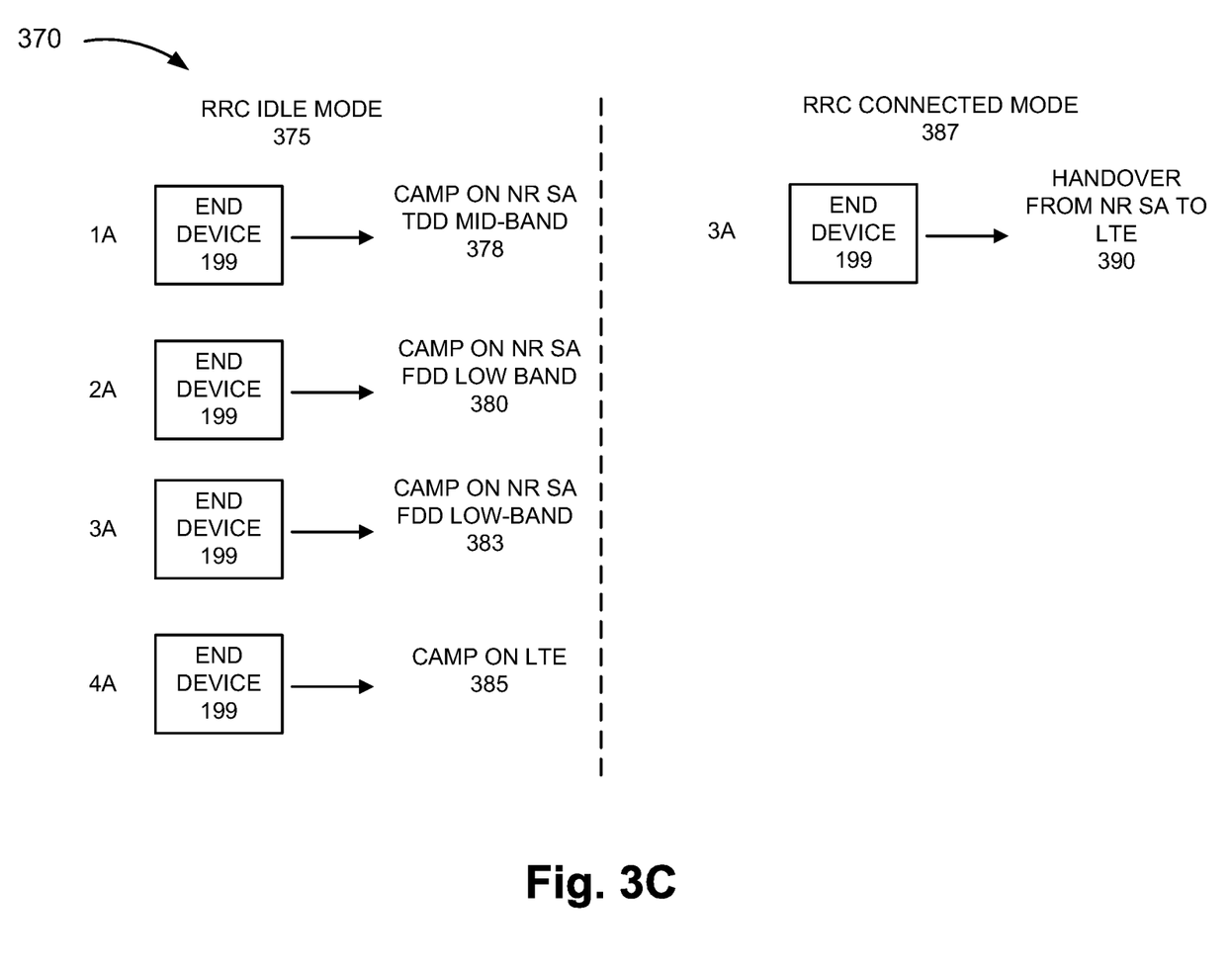
FIG. 3C is a diagram illustrating yet another exemplary process of an exemplary embodiment of the core network selection service.

FIG. 3C is a diagram illustrating yet another exemplary process 370 of the core network selection service. Process 370 may relate to when end device 199 moves from 1A to 4A of FIG. 2. Referring to FIG. 3C and FIG. 2, when end device 199 may be in an RRC idle mode 375 and in an NR TDD mid-band UL/DL coverage area 210 (e.g., 1A of FIG. 2), end device 199 may camp on an NR SA TDD mid-band cell 378. When end device 199 may be in RRC idle mode 375 and in an NR SA TDD mid-band DL coverage area 208 (e.g., 2A of FIG. 2), end device 199 may camp on an NR SA FDD low band cell 380. When end device 199 may be in RRC idle mode 375 and in an NR SA FDD low band coverage area 206 (e.g., 3A of FIG. 2), end device 199 may camp on an NR SA FDD low band cell 383, and when in an LTE coverage area 204 (e.g., 4A of FIG. 2), end device 199 may camp on an LTE cell 385.

As further illustrated, when end device 199 may be in an RRC connected mode 387 while in an NR FDD low band coverage area 206 (e.g., 3A of FIG. 2), the core network selection service may perform a handover from an NR SA cell to an LTE cell 390. If end device 199 transitions to an RRC idle mode after the handover while in situated at 3A, for example, end device 199 may camp on the LTE cell. There may be no further transitions between the 5GC network and the EPC network unless end device 199 moves back to area 1A or 2A of FIG. 2, for example.

Figure 4:
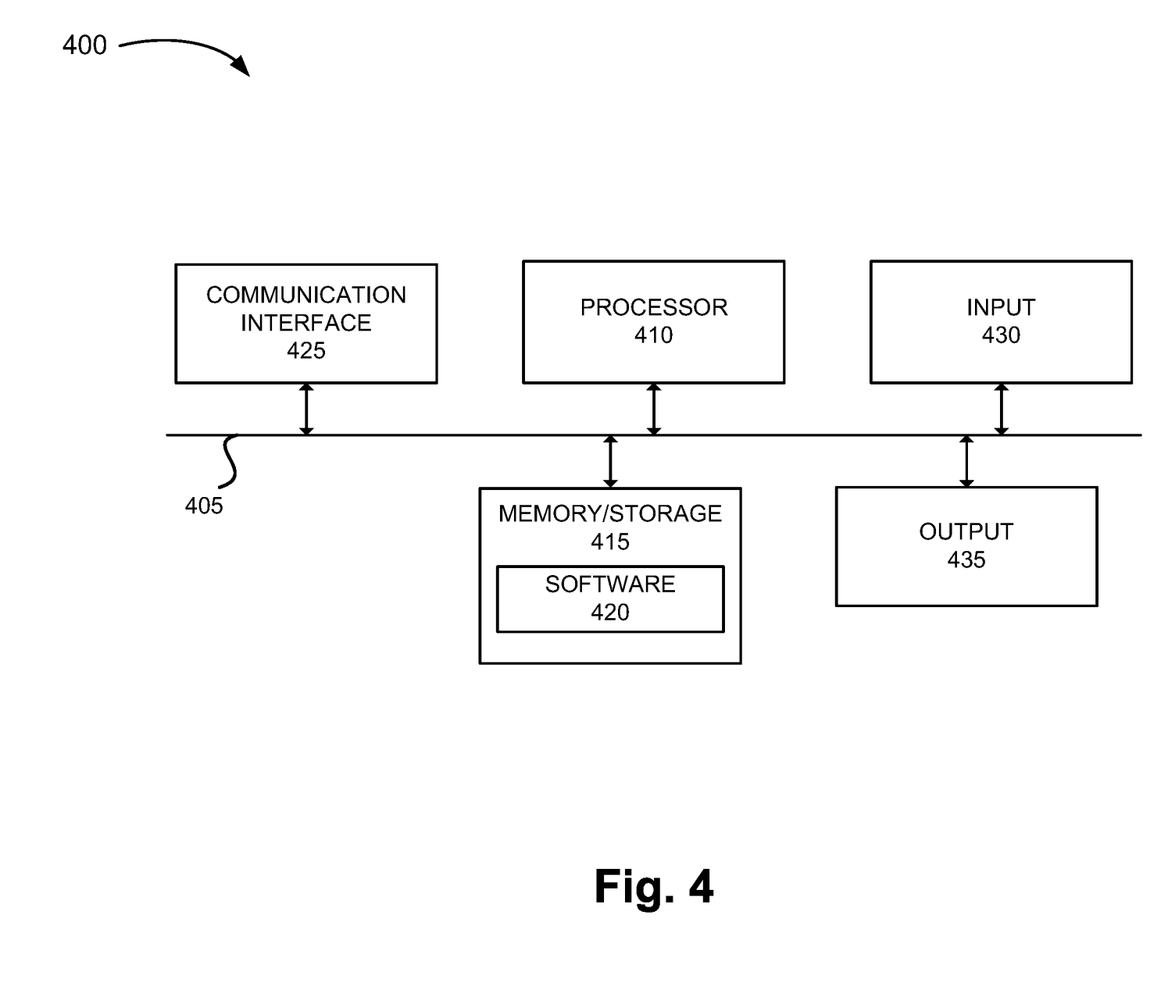
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access devices 110, core devices 155, external devices 175, end devices 199, eNB 302, gNB 315, and other types of network devices or logic, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to access device 110, software 420 may include an application that, when executed by processor 410, provides a function of the core network selection service, as described herein. Additionally, for example, with reference to end device 199, software 420 may include an application that, when executed by processor 410, provides a function of the core network selection service. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc., as previously described.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process and/or a function, as described herein. Alternatively, for example, according to other implementations, device 400 performs a process and/or a function as described herein based on the execution of hardware (processor 410, etc.).

Figure 5:
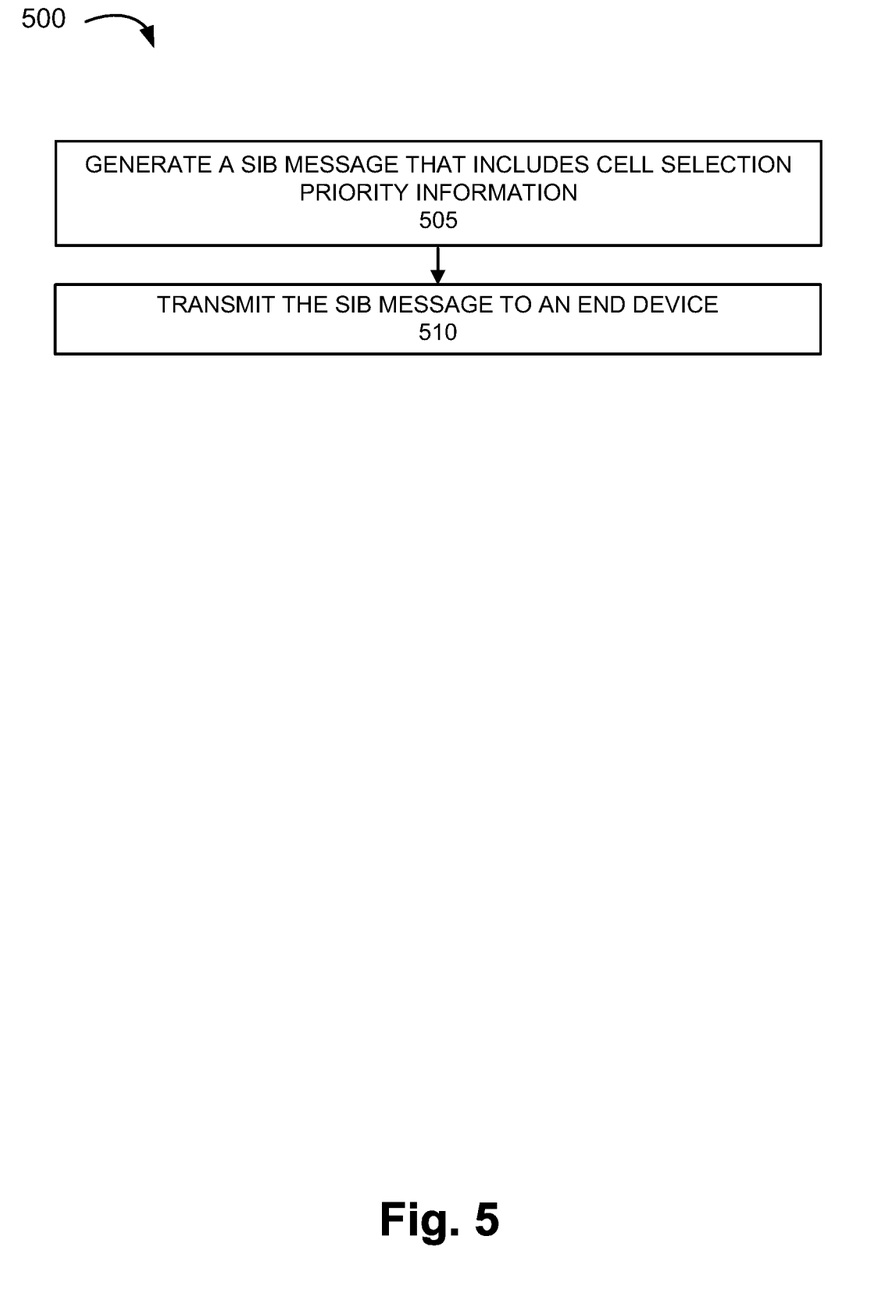
FIG. 5 is a flow diagram illustrating an exemplary process of an exemplary embodiment of the core network selection service.

FIG. 5 is a flow diagram illustrating an exemplary process 500 of an exemplary embodiment of the core network selection service. According to an exemplary embodiment, access device 110 may perform steps of process 500. According to an exemplary implementation, processor 410 may execute software 420 to perform a step illustrated in FIG. 5 and described herein. Alternatively, a step illustrated in FIG. 5 and described herein, may be performed by execution of only hardware. According to an exemplary environment, process 500 may be performed in a multi-RAT RAN (e.g., a 5G-RAN and an E-UTRAN) and associated multi-core complementary networks, as illustrated and described herein.

Referring to FIG. 5, in block 505, access device 110 may generate a SIB message that includes cell selection priority information. For example, an eNB may generate a SIB message that includes an order of cell selection priority in which NR SA TDD mid-band cells have a higher priority than LTE cells. The eNB may provide LTE coverage in the uplink and the downlink. The eNB may have a first neighboring access device 110 (e.g., a gNB) that provides NR SA TDD mid-band coverage for both the uplink and the downlink. Additionally, the eNB may have a second neighboring access device 110 (e.g., a gNB) that provides NR SA FDD low band coverage in the uplink and the downlink, and the order of cell selection priority does not include the NR SA FDD low band cell. According to another example, a gNB may generate a SIB message that includes an order of cell selection priority in which NR SA TDD mid-band cells have a higher priority than NR SA FDD low band cells, and the NR SA FDD low band cells have a higher priority than LTE cells. The gNB may provide NR SA TDD mid-band coverage in the uplink and the downlink. The gNB may have a first neighboring access device 110 (e.g., a gNB) that provides NR SA FDD low band coverage in the uplink and the downlink, and a second neighboring access device 110 (e.g., an eNB) that provides LTE coverage in the uplink and the downlink.

In block 510, access device 110 may transmit the SIB message. For example, the eNB may broadcast the SIB message. Alternatively, the gNB may transmit the SIB message.

FIG. 5 illustrates an exemplary process 500 of the core network selection service, however, according to other embodiments, process 500 may include additional operations and/or different operations than those illustrated in FIG. 5 and described herein. For example, process 500 may include the end device receiving the SIB message and performing a cell selection procedure in accordance with the cell selection priority information.

Figure 6:
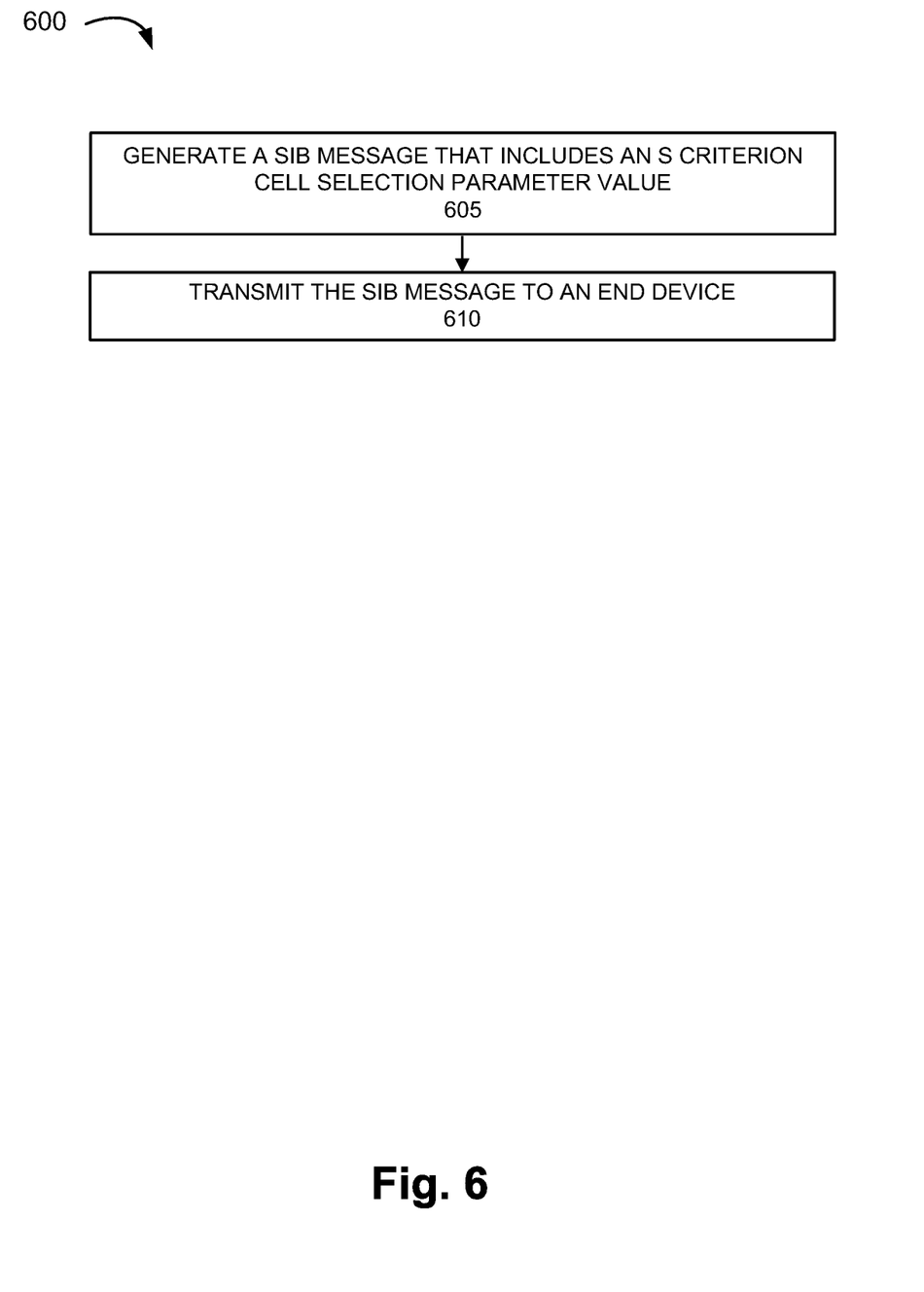
FIG. 6 is a flow diagram illustrating another exemplary process of an exemplary embodiment of the core network selection service.

FIG. 6 is a flow diagram illustrating another exemplary process 600 of an exemplary embodiment of the core network selection service. According to an exemplary embodiment, access device 110 may perform steps of process 600. According to an exemplary implementation, processor 410 executes software 420 to perform a step illustrated in FIG. 6 and described herein. Alternatively, a step illustrated in FIG. 6 and described herein, may be performed by execution of only hardware. According to an exemplary environment, process 600 may be performed in a multi-RAT RAN (e.g., a 5G-RAN and an E-UTRAN) and associated multi-core complementary networks, as illustrated and described herein.

Referring to FIG. 6, in block 605, access device 110 may generate a SIB message that includes an S criterion cell selection parameter value. For example, a gNB may generate a SIB message that includes a value for $Q_{rxlevmin}$ and/or a value for $Q_{rxlevminoffset}$ relating to the S criterion cell value Srxlev. Additionally, or alternatively, the SIB message may include a value for $Q_{qualmin}$ and/or a value for $Q_{qualminoffset}$ relating to the S criterion value Squal. The value included in the SIB message may prevent end device 199 from camping on the gNB when end device 199 is situated in a locale that does not provide uplink coverage from the gNB (e.g., at 2A or 2B of FIG. 2). The gNB may provide NR SA TDD mid-band coverage in the uplink and the downlink. The gNB may have a first neighboring access device 110 (e.g., a gNB) that provides NR SA FDD low band coverage for both the uplink and the downlink. Additionally, the gNB may have a second neighboring access device 110 (e.g., an eNB) that provides LTE coverage in the uplink and the downlink.

In block 610, access device 110 may transmit the SIB message. For example, the gNB may broadcast the SIB message.

FIG. 6 illustrates an exemplary process 600 of the core network selection service, however, according to other embodiments, process 600 may include additional operations, fewer operations, and/or different operations than those illustrated in FIG. 6 and described herein. For example, process 600 may include the end device receiving the SIB message and a cell selection procedure (e.g., camping on a non-NR SA TDD mid-band cell while in RRC idle mode) in accordance with the Q-value relating to a calculation of an Srxlev value and/or an Squal value.

Figure 7:
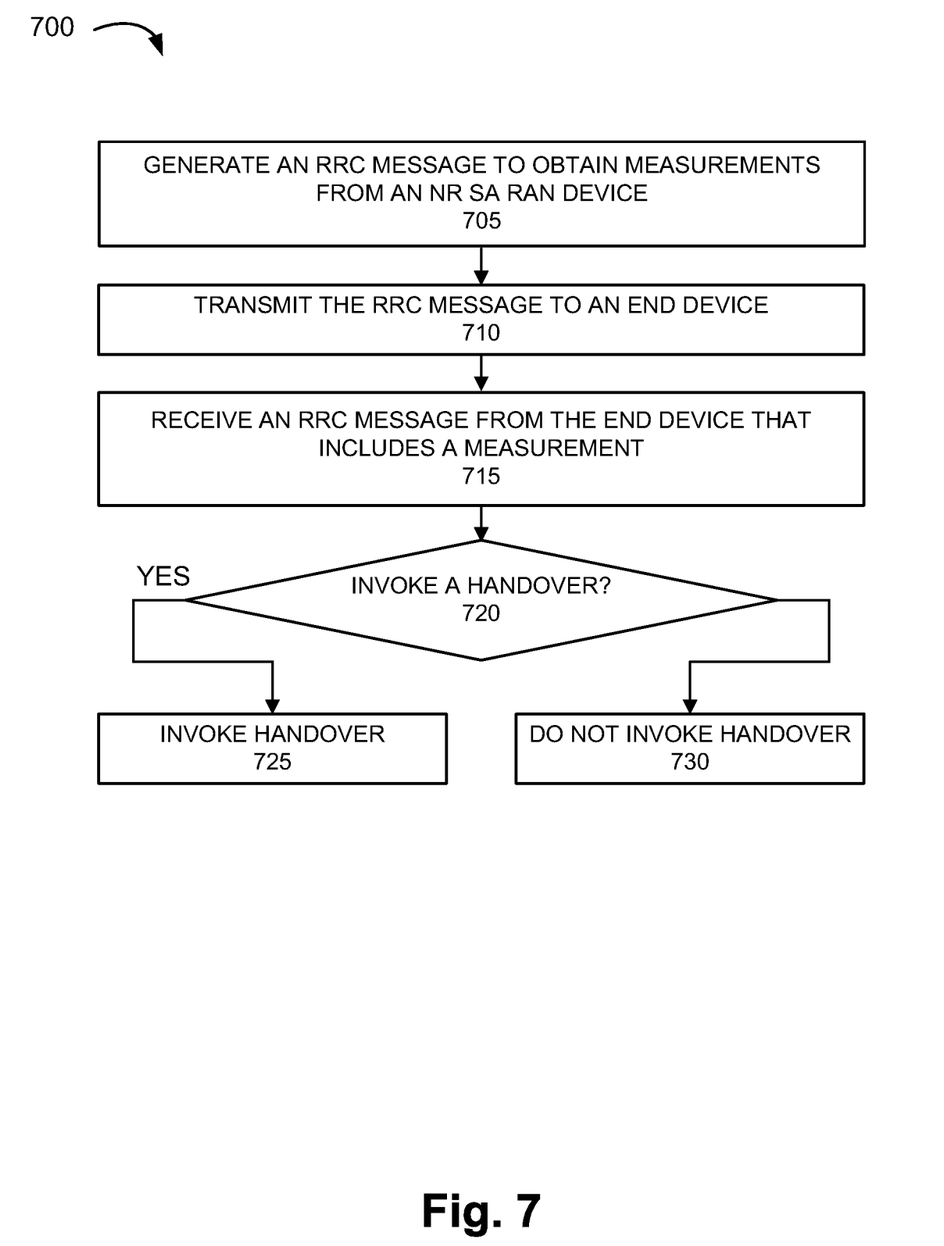
FIG. 7 is a flow diagram illustrating yet another exemplary process of an exemplary embodiment of the core network selection service.

FIG. 7 is a flow diagram illustrating yet another exemplary process 700 of an exemplary embodiment of the core network selection service. According to an exemplary embodiment, access device 110 may perform steps of process 700. According to an exemplary implementation, processor 410 executes software 420 to perform a step illustrated in FIG. 7 and described herein. Alternatively, a step illustrated in FIG. 7 and described herein, may be performed by execution of only hardware. According to an exemplary environment, process 700 may be performed in a multi-RAT RAN (e.g., a 5G-RAN and an E-UTRAN) and associated multi-core complementary networks, as illustrated and described herein. According to an exemplary embodiment, process 700 may be performed when end device 199 is operating in an RRC connected mode relative to access device 110.

Referring to FIG. 7, in block 705, access device 110 may generate an RRC message that requests end device 199 to obtain measurements from a neighboring access device 110. For example, an eNB may generate an RRC Connection Reconfiguration message that includes a request for end device 199 to obtain NR SA measurements relating to a neighboring gNB. The NR SA measurements may relate to signal quality, signal power, and/or other event of a measurement report. The eNB may provide LTE coverage to end device 199, and end device 199 may be operating in an RRC connected mode relative to the eNB. The neighboring gNB may provide NR SA coverage.

In block 710, access device 110 may transmit the RRC message. For example, the eNB may transmit the RRC Connection Reconfiguration message to end device 199.

In block 715, access device 110 may receive from end device an RRC message. For example, the eNB may receive an RRC Connection Reconfiguration message or an RRC Measurement Report message, which includes an NR SA measure of the gNB, from end device 199.

In block 720, it may be determined whether to invoke a handover. For example, the eNB may analyze the NR SA measurement. By way of further example, the eNB may compare the NR SA measurement to a threshold value. Based on the result of the analysis, the eNB may determine whether to invoke the handover of end device 199 to the gNB that provides NR SA coverage.

When it is determined that the handover is to be invoked (block 720—YES), access device 110 may invoke the handover of end device 199 (block 725). For example, the eNB invokes the handover of end device 199 to the gNB. When it is determined that the handover is not to be invoked (block 720-NO), access device 110 may not invoke the handover of end device 199 (block 730). For example, the eNB may not invoke the handover of end device 199 to the gNB, and end device 199 may remain in the RRC connected mode relative to the eNB.

FIG. 7 illustrates an exemplary process 700 of the core network selection service, however, according to other embodiments, process 700 may include additional operations, fewer operations, and/or different operations than those illustrated in FIG. 7 and described herein. For example, process 700 may include end device 199 receiving the RRC message, searching/scanning for an NR SA cell, performing a measurement, and generating and transmitting the RRC message to the eNB.

Figure 8:
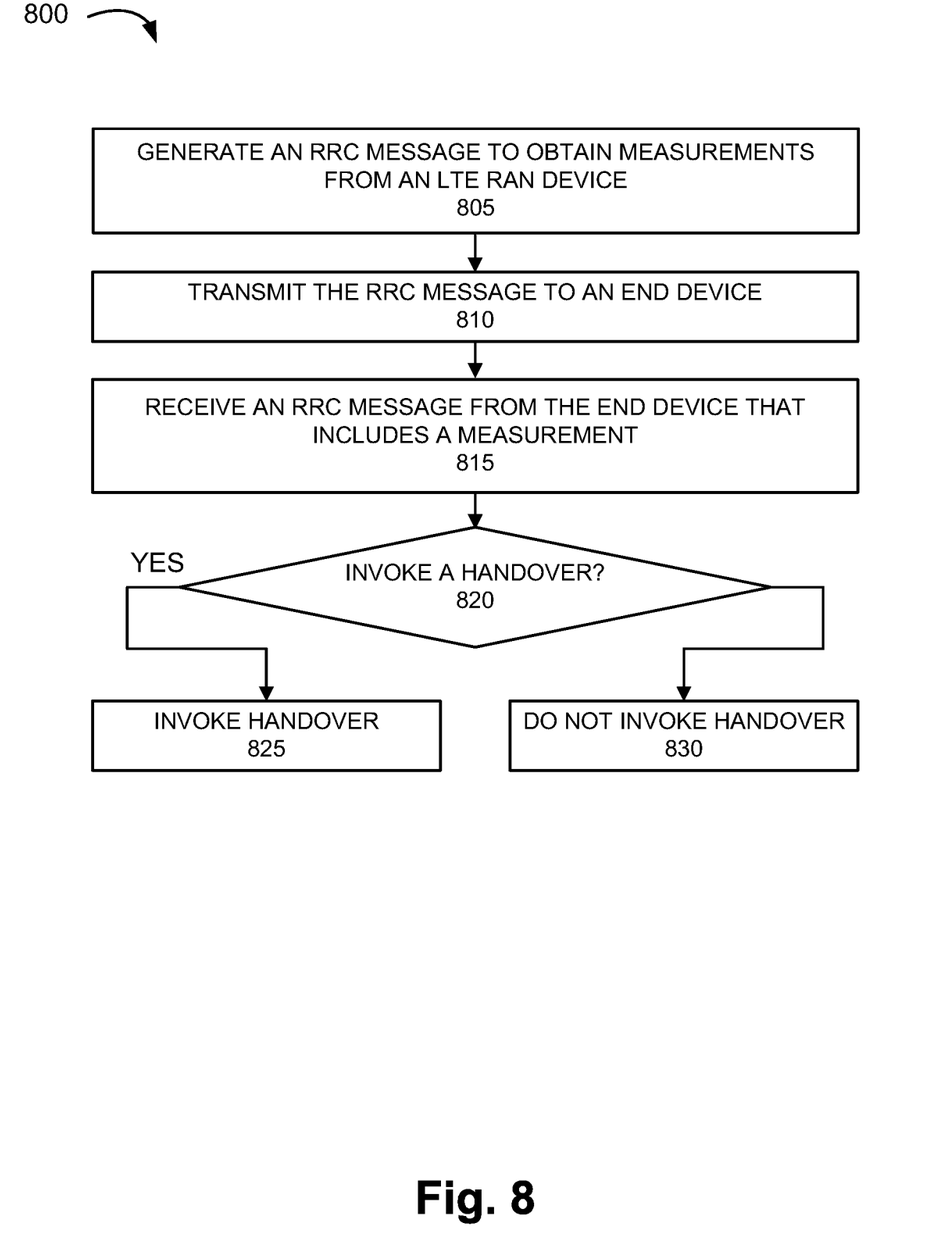
FIG. 8 is a flow diagram illustrating still another exemplary process of an exemplary embodiment of the core network selection service.

FIG. 8 is a flow diagram illustrating still another exemplary process 800 of an exemplary embodiment of the core network selection service. According to an exemplary embodiment, access device 110 may perform steps of process 800. According to an exemplary implementation, processor 410 executes software 420 to perform a step illustrated in FIG. 8 and described herein. Alternatively, a step illustrated in FIG. 8 and described herein, may be performed by execution of only hardware. According to an exemplary environment, process 800 may be performed in a multi-RAT RAN (e.g., a 5G-RAN and an E-UTRAN) and associated multi-core complementary networks, as illustrated and described herein. According to an exemplary embodiment, process 800 may be performed when end device 199 is operating in an RRC connected mode relative to access device 110.

Referring to FIG. 8, in block 805, access device 110 may generate an RRC message that requests end device 199 to obtain measurements from a neighboring access device 110. For example, a gNB may generate an RRC Connection Reconfiguration message that includes a request for end device 199 to obtain LTE measurements relating to a neighboring eNB. The LTE measurements may relate to signal quality, signal power, and/or other event of a measurement report. The eNB may provide LTE coverage to end device 199, and end device 199 may be operating in an RRC connected mode relative to the eNB. The gNB may provide NR SA coverage.

In block 810, access device 110 may transmit the RRC message. For example, the gNB may transmit the RRC Connection Reconfiguration message to end device 199.

In block 815, access device 110 may receive from end device an RRC message. For example, the gNB may receive an RRC Connection Reconfiguration message or an RRC Measurement Report message, which includes an NR SA measurement of the eNB, from end device 199.

In block 820, it may be determined whether to invoke a handover. For example, the gNB may analyze the LTE measurement. By way of further example, the gNB may compare the LTE measurement to a threshold value. Based on the result of the analysis, the gNB may determine whether to invoke the handover of end device 199 to the eNB that provides LTE coverage.

When it is determined that the handover is to be invoked (block 820—YES), access device 110 may invoke the handover of end device 199 (block 825). For example, the gNB invokes the handover of end device 199 to the eNB. When it is determined that the handover is not to be invoked (block 820-NO), access device 110 may not invoke the handover of end device 199 (block 830). For example, the gNB may not invoke the handover of end device 199 to the eNB, and end device 199 may remain in the RRC connected mode relative to the gNB.

FIG. 8 illustrates an exemplary process 800 of the core network selection service, however, according to other embodiments, process 800 may include additional operations, fewer operations, and/or different operations than those illustrated in FIG. 8 and described herein. For example, process 800 may include end device 199 receiving the RRC message, searching/scanning for an LTE cell, performing a measurement, and generating and transmitting the RRC message to the gNB.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 5, 6, 7, and 8 the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   generating, by wireless stations of a multi-radio access technology (RAT) radio access network (RAN) that includes a new radio (NR) RAN and a RAN of a Long Term Evolution (LTE) network, a system information block (SIB) message that includes cell reselection priority information, wherein an order of priority configures an end device to camp on only an LTE cell unless the end device moves to a first area of the multi-RAT RAN that provides NR stand-alone (SA) uplink and downlink coverage, and further configures the end device to camp on only an NR SA cell, unless the end device moves to a second area of the multi-RAT RAN that provides only LTE uplink and downlink coverage, and further includes a parameter value relating to a calculation of a cell selection criterion S value that configures and prevents the end device from camping on a first wireless station of the wireless stations; and
   broadcasting, by the wireless stations, the SIB message to the end device.

2. The method of claim 1, wherein the first area of the multi-RAT RAN includes first wireless stations of the wireless stations that provide NR SA mid-band uplink and downlink coverage, NR SA low band uplink and downlink coverage, and LTE uplink and downlink coverage, and wherein for the SIB message generated by a first wireless station of the first wireless stations that provides the NR SA mid-band uplink and downlink coverage, the order of priority from highest to lowest includes an NR SA mid-band, an NR SA low band, and an LTE band.

3. The method of claim 1, wherein a third area of the multi-RAT RAN includes NR SA mid-band downlink only coverage, NR SA low band uplink and downlink coverage, and LTE uplink and downlink coverage.

4. The method of claim 3, wherein for the SIB message generated by a second wireless station of the second area that provides the LTE uplink and downlink coverage, the order of priority from highest to lowest includes an NR SA mid-band and an LTE band, and the order of priority omits an NR SA low band.

5. The method of claim 3, wherein the first wireless station of the wireless stations provides NR SA mid-band uplink and downlink coverage when the end device is in an idle mode and in the third area of the multi-RAT RAN.

6. The method of claim 3, wherein, when the end device is in a connected mode with a wireless station of the wireless stations that provides the LTE uplink and downlink coverage in the third area, the method further comprising:
   invoking, by the wireless station, a handover of the end device to a primary wireless station that provides NR SA with carrier aggregation in conjunction with a secondary wireless station.

7. The method of claim 6, wherein when the end device subsequently transitions from the connected mode to an idle mode, based on the SIB message, the end device camps on the primary wireless station, wherein the primary wireless station provides NR SA frequency division duplexing (FDD) low band coverage.

8. The method of claim 3, wherein a fourth area of the multi-RAT RAN includes fourth wireless stations of the wireless stations that provide NR SA low band uplink and downlink coverage, and LTE uplink and downlink coverage.

9. The method of claim 8, wherein, when the end device is in a connected mode with a wireless station of the wireless stations that provides the NR SA low band uplink and downlink coverage in the fourth area, the method further comprising:
   invoking, by the wireless station, a handover of the end device to another wireless station that provides the LTE uplink and downlink coverage.

10. The method of claim 9, wherein when the end device subsequently transitions from the connected mode to an idle mode, based on the SIB message, the end device camps on the other wireless station.

11. A system comprising:
    wireless stations of a multi-radio access technology (RAT) radio access network (RAN) that includes a new radio (NR) RAN and a RAN of a Long Term Evolution (LTE) network, wherein each wireless station comprises a processor configured to:
    generate a system information block (SIB) message that includes cell reselection priority information, wherein an order of priority configures an end device to camp on only an LTE cell unless the end device moves to a first area of the multi-RAT RAN that provides NR stand-alone (SA) uplink and downlink coverage, and further configures the end device to camp on only an NR SA cell, unless the end device moves to a second area of the multi-RAT RAN that provides only LTE uplink and downlink coverage, and further includes a parameter value relating to a calculation of a cell selection criterion S value that configures and prevents the end device from camping on a first wireless station of the wireless stations; and broadcast the SIB message to the end device.

12. The system of claim 11, wherein the first area of the multi-RAT RAN includes first wireless stations of the wireless stations that provide NR SA mid-band uplink and downlink coverage, NR SA low band uplink and downlink coverage, and LTE uplink and downlink coverage, and wherein for the SIB message generated by a first wireless station of the first wireless stations that provides the NR SA mid-band uplink and downlink coverage, the order of priority from highest to lowest includes an NR SA mid-band, an NR SA low band, and an LTE band.

13. The system of claim 11, wherein a third area of the multi-RAT RAN includes NR SA mid-band downlink only coverage, NR SA low band uplink and downlink coverage, and LTE uplink and downlink coverage.

14. The system of claim 13, wherein for the SIB message generated by a second wireless station of the second area that provides the LTE uplink and downlink coverage, the order of priority from highest to lowest includes an NR SA mid-band and an LTE band, and the order of priority omits an NR SA low band.

15. The system of claim 13, wherein the first wireless station of the wireless stations provides NR SA mid-band uplink and downlink coverage when the end device is in an idle mode and in the third area of the multi-RAT RAN.

16. The system of claim 13, wherein, when the end device is in a connected mode with a wireless station of the wireless stations that provides the LTE uplink and downlink coverage in the third area, the processor of the wireless station is further configured to:

invoke a handover of the end device to a primary wireless station that provides NR SA with carrier aggregation in conjunction with a secondary wireless station.

17. The system of claim 16, wherein when the end device subsequently transitions from the connected mode to an idle mode, based on the SIB message, the end device camps on the primary wireless station, wherein the primary wireless station provides NR SA frequency division duplexing (FDD) low band coverage.

18. The system of claim 13, wherein a fourth area of the multi-RAT RAN includes fourth wireless stations of the wireless stations that provide NR SA low band uplink and downlink coverage, and LTE uplink and downlink coverage.

19. A non-transitory computer-readable storage medium storing instructions executable by processors of wireless stations of a multi-radio access technology (RAT) radio access network (RAN) that includes a new radio (NR) RAN and a RAN of a Long Term Evolution (LTE) network, which when executed cause the wireless stations to:

generate a system information block (SIB) message that includes cell reselection priority information, wherein an order of priority configures an end device to camp on only an LTE cell unless the end device moves to a first area of the multi-RAT RAN that provides NR stand-alone (SA) uplink and downlink coverage, and further configures the end device to camp on only an NR SA cell, unless the end device moves to a second area of the multi-RAT RAN that provides only LTE uplink and downlink coverage, and further includes a parameter value relating to a calculation of a cell selection criterion S value that configures and prevents the end device from camping on a first wireless station of the wireless stations; and broadcast the SIB message to the end device.

20. The non-transitory computer-readable storage medium of claim 19, wherein a third area of the multi-RAT RAN includes NR SA mid-band downlink only coverage, NR SA low band uplink and downlink coverage, and LTE uplink and downlink coverage, and wherein a fourth area of the multi-RAT RAN includes fourth wireless stations of the wireless stations that provide NR SA low band uplink and downlink coverage, and LTE uplink and downlink coverage.

* * * * *